(12) United States Patent
Gardel et al.

(10) Patent No.: US 12,209,554 B2
(45) Date of Patent: Jan. 28, 2025

(54) THRUST REVERSER HAVING THREE GATES

(71) Applicant: SAFRAN NACELLES, Gonfreville-l'Orcher (FR)

(72) Inventors: Romain Gardel, Moissy-cramayel (FR); Thomas Marlay, Moissy-cramayel (FR); Matthieu Menielle, Moissy-cramayel (FR); Ophélie Schmitter, Moissy-cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 60 days.

(21) Appl. No.: 18/002,445

(22) PCT Filed: Jun. 2, 2021

(86) PCT No.: PCT/FR2021/051000
§ 371 (c)(1),
(2) Date: Dec. 19, 2022

(87) PCT Pub. No.: WO2021/260285
PCT Pub. Date: Dec. 30, 2021

(65) Prior Publication Data
US 2023/0258147 A1    Aug. 17, 2023

(30) Foreign Application Priority Data
Jun. 25, 2020  (FR) ...................................... 2006643

(51) Int. Cl.
*F02K 1/76*   (2006.01)
*B64D 29/00*  (2006.01)
*F02K 1/60*   (2006.01)

(52) U.S. Cl.
CPC .............. *F02K 1/763* (2013.01); *B64D 29/00* (2013.01); *F02K 1/60* (2013.01)

(58) Field of Classification Search
CPC ... F02K 1/68; F02K 1/605; F02K 1/60; F02K 1/763
See application file for complete search history.

(56) References Cited

U.S. PATENT DOCUMENTS 2,620,622 A  * 12/1952  Klas ......................... F02K 1/60
                                                        239/265.37
2,753,684 A     7/1956  Greene
(Continued)

FOREIGN PATENT DOCUMENTS

EP    0 043 764 A1    1/1982
FR    2 727 468 A1    5/1996

OTHER PUBLICATIONS

International Search Report mailed on Jul. 20, 2021 in PCT/FR2021/051000 filed on Jun. 2, 2021 (citing references 1-5 & 15 therein, 5 pages).

(Continued)

*Primary Examiner* — Gerald L Sung
(74) *Attorney, Agent, or Firm* — Oblon, McClelland, Maier & Neustadt, L.L.P.

(57) ABSTRACT

A thrust reverser for an aircraft propulsion unit. The thrust reverser includes three gates that can be deployed downstream of an outlet section of the propulsion unit. The device increases the possibilities for installation of the reverser, in particular when a tail assembly extends in line with the propulsion unit.

5 Claims, 3 Drawing Sheets

(56) References Cited

U.S. PATENT DOCUMENTS

| | | | | |
|---|---|---|---|---|
| 3,684,183 | A | * | 8/1972 | Baerresen .................. F02K 1/74 |
| | | | | 239/265.29 |
| 4,194,692 | A | | 3/1980 | Dickenson |
| 4,410,152 | A | | 10/1983 | Kennedy et al. |
| 4,805,840 | A | * | 2/1989 | Tape .......................... F02K 1/60 |
| | | | | 60/230 |
| 5,058,828 | A | * | 10/1991 | Pillari ........................ F02K 1/60 |
| | | | | 239/265.29 |
| 5,230,213 | A | | 7/1993 | Lawson |
| 5,390,879 | A | * | 2/1995 | Lair ........................... F02K 1/60 |
| | | | | 244/110 B |
| 5,615,834 | A | | 4/1997 | Osman |
| 2003/0070417 | A1 | * | 4/2003 | Plumpe, Jr. ............... F15B 9/10 |
| | | | | 60/230 |

OTHER PUBLICATIONS

Written Opinion of the International Search Authority mailed on Jul. 20, 2021 in PCT/FR2021/051000 filed on Jun. 2, 2021 (citing references 1-3 therein, 8 pages).

* cited by examiner

THRUST REVERSER HAVING THREE GATES

TECHNICAL FIELD

The invention relates to the field of thrust reversers for aircraft propulsion units. It relates more specifically to a gate reverser, in particular for reversing a flow of fluid downstream of the propulsion unit.

The invention is of particular interest in the field of business aviation and in applications wherein the reverser equips a propulsion unit mounted in the rear part of the fuselage of an aircraft, in particular when the aircraft comprises a tail extending in line with the propulsion unit.

However, the invention is not limited to the aforementioned applications. For example, the invention also applies to a propulsion unit mounted under a wing.

PRIOR ART

In a manner known per se, certain thrust reversers are provided to generate a braking counter-thrust by redirecting upstream of the propulsion unit a flow of fluid leaving the turbomachine, that is to say by operating a deflection of this flow downstream of an outlet section of the turbomachine. For example, when the turbomachine is a turbofan engine, this type of reverser allows to invert a mixture of the primary flow and the secondary flow generated by the turbojet.

Document FR 2 727 468 A1 describes a thrust reverser capable of reversing such a double flow by pivoting gates around a respective rotation so that these gates form a deflecting obstacle extending downstream of the turbomachine.

Conventional gate reversers have limited installation possibilities, particularly given the space required to allow the gates to be deployed.

Thus, for example, the presence of a mast for attaching the propulsion unit to a wing or of a tail extending in line with the propulsion unit is liable to hinder the deployment of the gates or even to prevent the reverser or nacelle from being mounted on the aircraft.

DESCRIPTION OF THE INVENTION

The invention aims at providing a thrust reverser having greater possibilities of implantation while maintaining or improving the thrust reversal performance.

A particular purpose of the invention is to provide a reverser compatible with a propulsion unit mounted in the rear part of the fuselage of an aircraft, under a vertical tail of this aircraft, for which the reversal of the flow cannot be carried out upstream of the outlet section.

To this end, the object of the invention is a thrust reverser for an aircraft propulsion unit, comprising a rear fixed structure forming an outer shroud for guiding a flow of fluid and three gates movable between a direct thrust position, wherein the gates are retracted radially outwards from the rear fixed structure, and a reverse thrust position wherein they are configured to extend axially downstream of an outlet section of the propulsion unit so as to redirect said flow of fluid leaving the propulsion unit via this outlet section upstream of the propulsion unit.

Compared to a conventional reverser having two gates, the presence of a third gate allows to benefit from an additional inter-gate space, at which a part of a vertical tail or a mast can for example extend, and to improve the circumferential distribution of the deflection surfaces constituted by the gates.

This results in an increase in the possibilities of installing such a reverser and an improvement in thrust reversal performance.

Preferably, the reverser comprises a control device configured to move the gates between the direct thrust position and the reverse thrust position, the control device comprising connecting rods and an actuation device.

A control connecting rod device allows to obtain gate kinematics particularly adapted for reversing a flow downstream of the outlet section.

In one embodiment, said connecting rods include driving connecting rods and reaction connecting rods, each of the driving connecting rods being connected on the one hand to one of the gates and on the other hand to a movable part of the actuation device, each of the reaction connecting rods being connected on the one hand to one of the gates and being configured to be connected on the other hand to a fixed structure of the propulsion unit.

Such an arrangement of connecting rods provides a simple solution for reversing a flow downstream of the outlet section while allowing movement of the gates according to a complex movement combining translation and rotation.

Furthermore, such drive and reaction connecting rods can be connected to the side parts of the gates, which allows to dispense with cylinders extending circumferentially in the middle of the gates. The flow of fluid redirected by the gates is thus not impeded by such central cylinders, which allows to improve the thrust reversal performance.

Preferably, each gate is connected to two respective ones of said driving connecting rods and two respective ones of said reaction connecting rods.

In one embodiment, said connecting rods include control connecting rods, each of the driving connecting rods being connected to the movable part of the actuation device via a respective one of the control connecting rods.

It is preferred that the actuation device comprises three cylinders.

More preferably, each of the cylinders may comprise a rod connected to two of said driving connecting rods, one of which is articulated on one of the gates and the other is articulated on another of said gates.

This allows to limit the number of actuators while balancing the forces exerted on the gates.

The invention also relates to a nacelle for an aircraft propulsion unit, comprising a thrust reverser as defined above.

Another object of the invention is a propulsion unit for an aircraft, comprising such a nacelle or, more generally, being equipped with a thrust reverser as defined above.

The invention also relates to an aircraft, comprising such a propulsion unit and/or a nacelle as defined above.

In one embodiment, the aircraft comprises a vertical tail extending in line with the propulsion unit so that a first and a second of said gates of the thrust reverser extend laterally on either side, respectively, of the vertical tail.

According to another aspect, the invention relates to a method for moving the gates of a thrust reverser as defined above.

In one implementation, this method comprises a step of deploying the gates wherein the latter are moved from the direct thrust position to the reverse thrust position.

In another implementation, this method comprises a step of retracting the gates wherein the latter are moved from the reverse thrust position to the direct thrust position.

Other advantages and features of the invention will appear upon reading the detailed, non-limiting description which follows.

BRIEF DESCRIPTION OF THE DRAWINGS

The following detailed description refers to the attached drawings wherein.

DETAILED DESCRIPTION OF EMBODIMENTS

Figure 1:
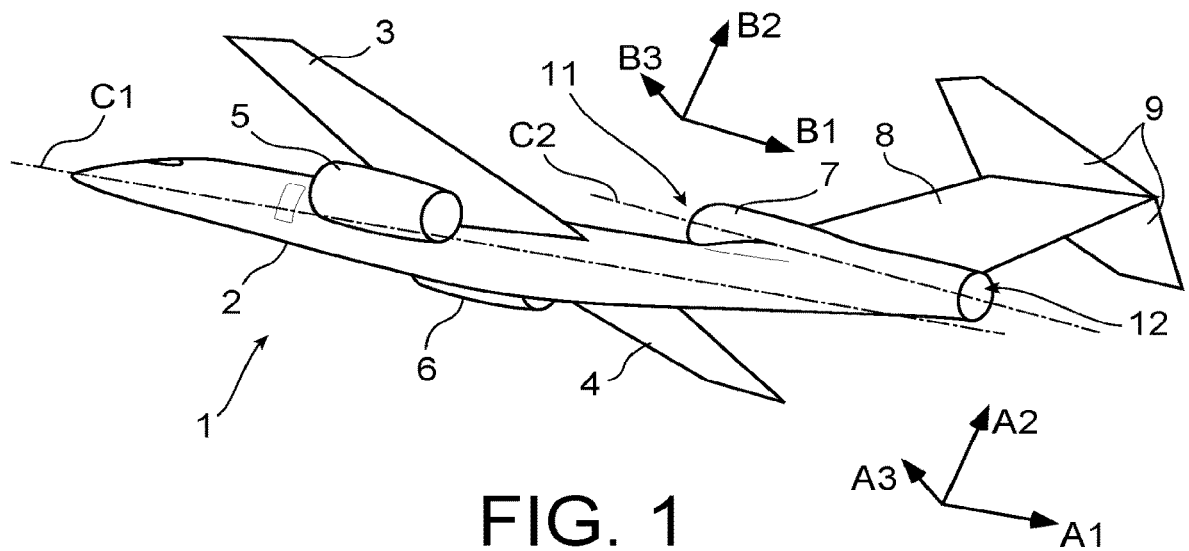
FIG. 1 is a schematic perspective view of an aircraft comprising a fuselage, a vertical tail and a propulsion unit mounted in the rear part of the fuselage under the vertical tail.

FIG. 1 comprises an absolute reference frame A1, A2 and A3 respectively defining horizontal, vertical and lateral directions orthogonal to each other. FIGS. 1 to 6 comprise a relative reference frame B1, B2 and B3 respectively defining longitudinal (or axial), radial and circumferential directions orthogonal to each other.

FIG. 1 shows an aircraft 1 comprising a fuselage 2, two wings 3 and 4, three propulsion units 5, 6 and 7, a vertical tail 8 and a horizontal tail 9.

The fuselage 2 of the aircraft 1 extends along a main axis C1. In FIG. 1, the aircraft 1 is in a reference layout wherein the main axis C1 is parallel to the horizontal direction A1. This reference layout corresponds in particular to the layout of the aircraft 1 on the ground relative to the reference frame A1-A2-A3.

The propulsion units 5 and 6 are connected to the wings 3 and 4, respectively. When the aircraft 1 is in the reference layout, the propulsion units 5 and 6 extend vertically under the wings 3 and 4.

The propulsion unit 7 is itself mounted in the rear part of the fuselage 2, that is to say at one of the ends of the fuselage 2 along the main axis C1.

The propulsion unit 7 has an inlet end 11 forming an air inlet and an outlet end 12 forming an outlet section for the evacuation of the gases generated by this propulsion unit 7.

The propulsion unit 7 extends along a central longitudinal axis C2 from its inlet end 11 to its outlet end 12.

The reference frame B1-B2-B3 relates to the propulsion unit 7, the longitudinal central axis C2 being parallel to the longitudinal direction B1.

In this example, the longitudinal central axis C2 is oblique with respect to the main axis C1 of the fuselage 2 of the aircraft 1, so that the distance in the radial direction B2 between the axes C1 and C2 is greater at the inlet end 11 than at the outlet end 12 of the propulsion unit 7.

In particular, when the aircraft 1 is in the reference layout of FIG. 1, the air inlet 11 of the propulsion unit 7 opens vertically above the fuselage 2.

The vertical tail 8 extends in line with the propulsion unit 7.

More specifically, the vertical tail 8 extends on one side of a first median longitudinal plane parallel to the plane B1-B3 crossing the central longitudinal axis C2 of the propulsion unit 7, while the fuselage 2 of the aircraft 1 extends globally on the other side of this first median longitudinal plane.

In this example, the horizontal tale 9 extends to the top of the vertical tail 8 forming with the latter a "T".

Figure 2:
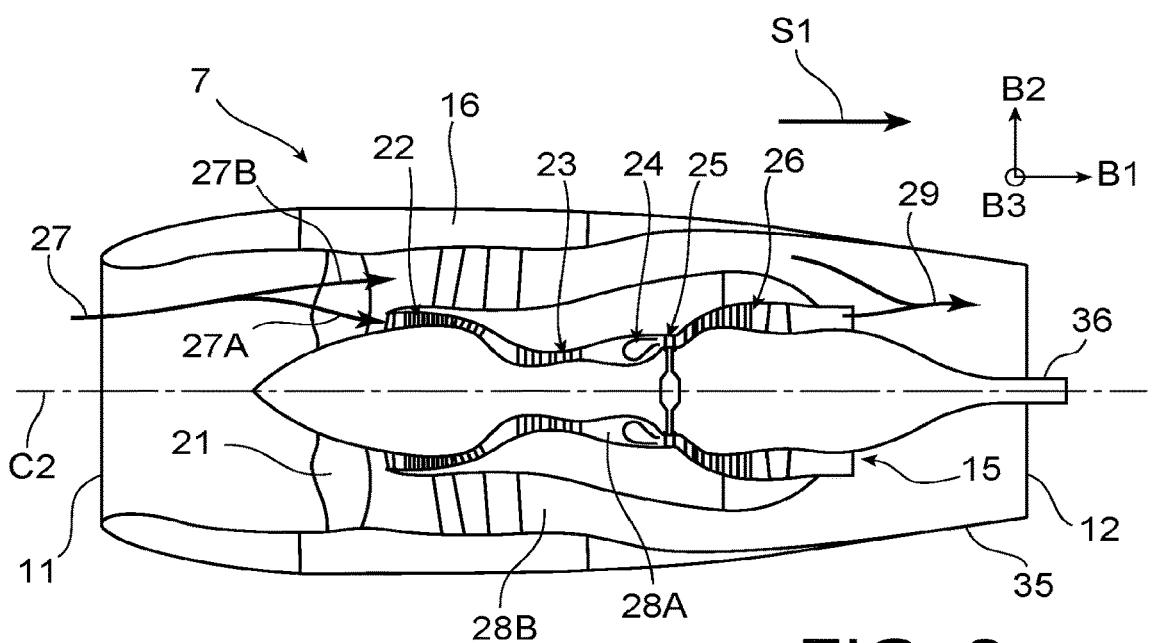
FIG. 2 is a schematic view in longitudinal section of a propulsion unit comprising a turbofan engine.

FIG. 2 shows the propulsion unit 7 in an embodiment wherein it comprises a turbomachine 15 of the turbofan type and a nacelle 16 housing this turbomachine 15.

FIG. 2 aims at illustrating the general principle of operation of the turbomachine 15. In this figure, the geometry of the nacelle 16 is simplified. Of course, the turbomachine 15 and more generally the propulsion unit 7 operate in a similar way when the nacelle 16 has a geometry identical to that shown in FIG. 1.

Subsequently, the terms "upstream" and "downstream" are defined with respect to a direction S1 of gas flow through the propulsion unit 7 along the central longitudinal axis C2.

The turbojet engine 15 comprises, from upstream to downstream, a fan 21, a low pressure compressor 22, a high pressure compressor 23, a combustion chamber 24, a high pressure turbine 25 and a low pressure turbine 26. The compressors 22 and 23, the combustion chamber 24 and the turbines 25 and 26 form a gas generator.

During the operation of the turbojet engine 15, an air flow 27 enters the propulsion unit 7 through the air inlet 11 upstream of the nacelle 16, passes through the fan 21 then is divided into a central primary flow 27A and a secondary flow 27B. The primary flow 27A flows in a primary gas circulation conduit 28A within the gas generator. The secondary flow 27B in turn flows in a secondary conduit 28B surrounding the gas generator and delimited radially outwards by an outer shroud of the nacelle 16.

Downstream of the turbojet engine 15, the primary flow 27A and the secondary flow 27B leaving the primary conduit 28A join together to form an outlet flow 29.

The invention relates more specifically to a thrust reverser allowing to generate a braking counter-thrust from such an outlet flow 29.

Figure 5:
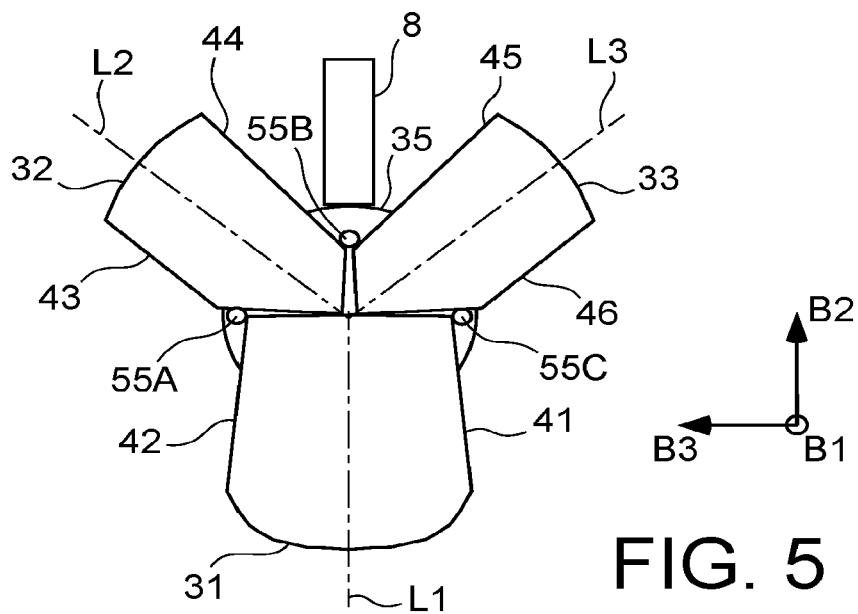
FIG. 5 is a schematic view of a thrust reverser in accordance with the invention, comprising three gates in the reverse thrust position.

In the example of FIG. 5, the reverser comprises three gates 31, 32 and 33 each connected to a rear fixed structure 35 of the nacelle 16.

Figure 3:
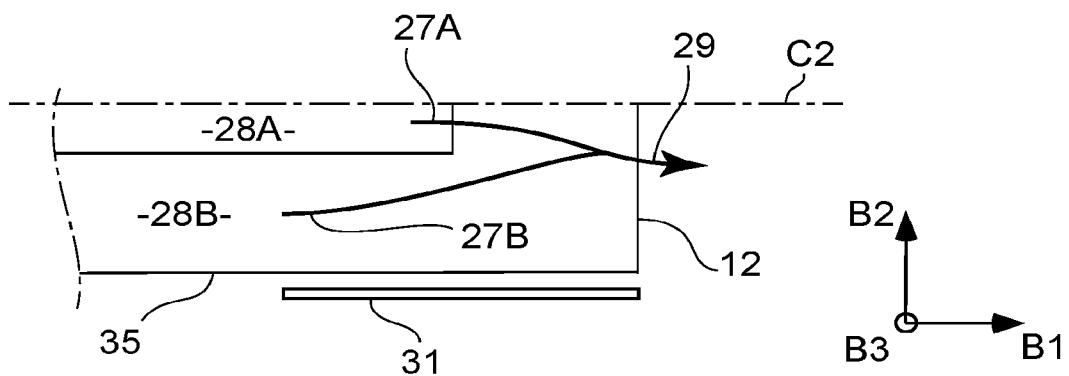
FIG. 3 is a schematic half-view in longitudinal section of a rear part of the propulsion unit of FIG. 2, showing a thrust reverser in accordance with the invention in direct jet configuration.
Figure 4:
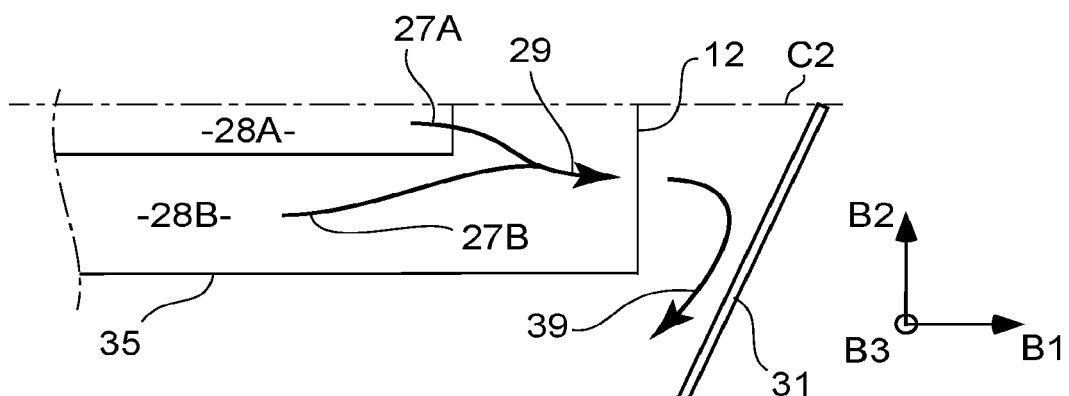
FIG. 4 is a schematic half-view in longitudinal section of a rear part of the propulsion unit of FIG. 2, showing the thrust reverser of FIG. 3 in reverse jet configuration.

The gates 31, 32 and 33 are movable between a direct thrust position, shown in FIG. 3, and a reverse thrust position, shown in FIG. 4.

FIGS. 3 and 4 only show the gate 31. Of course, the features relating to the gate 31 which can be deduced from these figures apply by analogy to the gates 32 and 33.

In the direct thrust position, the gates 31, 32 and 33 are retracted radially outside the rear fixed structure 35 of the nacelle 16 so that they do not impede the outlet flow 29. The outlet flow 29 thus flows entirely downstream of the propulsion unit 7 by generating a thrust.

More specifically, in this direct thrust configuration, the outlet flow 29 passes from upstream to downstream through said outlet section 12 while being guided radially outwards by an outer shroud of the rear fixed structure 35 and radially inwards by an ejection cone 36 visible in FIG. 2.

The gates 31, 32 and 33 thus retracted allow not to disturb the outlet flow 29, the guiding of this outlet flow 29 being ensured by the outer shroud of the rear fixed structure 35.

In other words, such a retraction of the gates 31, 32 and 33 allows to form a smooth nozzle and to prevent their operating clearances, called "steps and gaps", from causing pressure drops and generating shock waves, in particular when the aircraft is a supersonic aircraft.

Such a retraction of the gates 31, 32 and 33 thus allows to avoid a reduction in the speed of ejection and the thrust.

In the reverse thrust position, the gates 31, 32 and 33 extend axially downstream of the outlet section 12 so as to redirect part 39 of the outlet flow 29 upstream of the propulsion unit 7.

For this purpose, in a manner known per se, each of the gates 31, 32 and 33 in the reverse thrust position is oriented obliquely with respect to the central longitudinal axis C2, so that the end of this gate located radially inwards is located further downstream than its end located radially outwards.

Any known technique can be implemented to maximise the axial component of the flow 39 thus redirected, for example by equipping the gates 31, 32 and 33 with deflector spoilers (not shown).

In the example of FIG. 5, the gate 31 extends from one side of said first median longitudinal plane. The vertical tail 8 and the gates 32 and 33 extend on the other side of this first median longitudinal plane.

The gate 32 extends on one side of a second median longitudinal plane crossing the central longitudinal axis C2 and being parallel to the plane B1-B2, while the gate 33 extends on the other side of this second median longitudinal plane. The second median longitudinal plane crosses the vertical tail 8.

The gates 31, 32 and 33 each comprise two side edges, respectively referenced 41 and 42, 43 and 44, and 45 and 46, which delimit these gates circumferentially.

Each of the gates 31, 32 and 33 has a fictitious median line L1, L2 and L3 respectively, passing between the side edges of this gate and defining a spanwise direction of this gate when the latter is in the reverse thrust position.

In this example, in reverse thrust position, the median line of each of the gates 31, 32 and 33 forms, in a transverse plane B2-B3 perpendicular to the central longitudinal axis C2, an angle of 120° with the median line of each of the other two gates.

The geometry of the side edges and more generally of the gates 31, 32 and 33 is defined in such a way as to maximise the surface of the gates 31, 32 and 33 helping to redirect the outlet flow 29 while avoiding interference of these gates 31, 32 and 33 with each other and with other parts of the propulsion unit 7 such as the vertical tail 8 when they move between the direct thrust and reverse thrust positions.

Thus, the gates 31, 32 and 33 circumferentially define therebetween spaces which, in reverse thrust position, do not contribute to redirecting the outlet flow 29 upstream of the propulsion unit 7.

In the example of FIG. 5, a first inter-gate space is delimited by the side edge 42 of the gate 31 and by the side edge 43 of the gate 32, a second inter-gate space is delimited by the side edge 44 of the gate 32 and by the side edge 45 of the gate 33, and a third inter-gate space is delimited by the side edge 46 of the gate 33 and by the side edge 41 of the gate 31.

The vertical tail 8 extends into the second inter-gate space.

These inter-gate spaces allow to receive parts of the propulsion unit 7 or of the aircraft 1 while avoiding any collision with the gates 31, 32 and 33 of the reverser regardless of their position.

Figure 6:
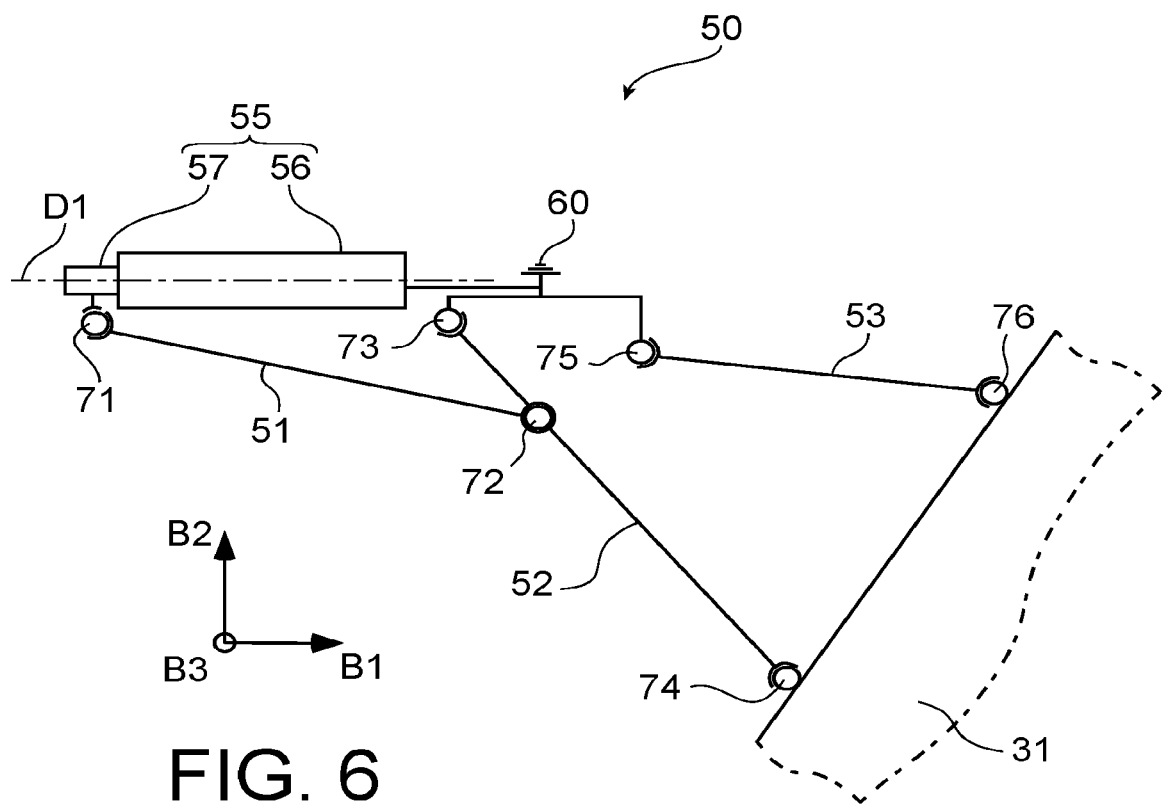
FIG. 6 is a schematic illustration of a control device for a gate of the reverser of FIG. 5.

The control of the gates 31, 32 and 33 is performed by a device 50 as shown in FIG. 6.

FIG. 6 more specifically shows a part of the control device 50 allowing to move the gate 31 between the direct thrust position and the reverse thrust position. In FIG. 6, the gate 31 is in reverse thrust position. The following applies by analogy to the control of the gates 32 and 33.

The control device 50 of FIG. 6 comprises on the one hand a series of connecting rods 51, 52 and 53 and on the other hand a cylinder 55.

The cylinder 55 comprises a fixed part 56, connected to a fixed structure 60 of the propulsion unit 7, and a rod 57 sliding relative to the fixed part 56 along an actuating axis D1.

In this example, the actuation axis D1 is parallel to the central longitudinal axis C2 of the propulsion unit 7.

A first connecting rod 51, called "control connecting rod", is articulated at one of its ends on the rod 57 of the cylinder 55, by a first articulation 71 which allows rotation of this connecting rod 51 with respect to the rod 57 around an axis of rotation formed by this first articulation 71. The control connecting rod 51 is articulated at another of its ends on an intermediate part of a second connecting rod 52, called "driving connecting rod", by a second articulation 72 which allows rotation of the connecting rods 51 and 52 relative to each other around an axis of rotation formed by this second articulation 72. The intermediate part of the driving connecting rod 52 is located between a first and a second end of this connecting rod 52.

The driving connecting rod 52 is moreover articulated at its first end on the fixed structure 60 of the propulsion unit 7 by a third articulation 73 which allows a rotation of the connecting rod 52 with respect to the fixed structure 60 around an axis of rotation formed by this third articulation 73. The driving connecting rod 52 is finally articulated at its second end on the gate 31 by a fourth articulation 74 which allows a rotation of the gate 31 with respect to the connecting rod 52 around an axis of rotation formed by this fourth articulation 74.

A third connecting rod 53, called "reaction connecting rod", is articulated at one of its ends on the fixed structure 60 of the propulsion unit 7 by a fifth articulation 75 which allows rotation of this connecting rod 53 relative to the fixed structure 60 around an axis of rotation formed by this fifth articulation 75. The reaction connecting rod 53 is articulated at another of its ends on the gate 31 by a sixth articulation 76 which allows a rotation of the gate 31 with respect to the connecting rod 53 around an axis of rotation formed by this sixth articulation 76.

In this example, the driving connecting rod 52 is articulated on a part of the gate 31 located upstream with respect to the part of the gate 31 on which the reaction connecting rod 53 is articulated.

When the rod 57 of the cylinder 55 is moved in the direction of actuation D1 upstream, with respect to the fixed part 56 of this cylinder 55, that is to say towards the left of FIG. 6, the control connecting rod 51 exerts on the driving connecting rod 52, via said second articulation 72, a force which drives this intermediate part of the connecting rod 52 upstream. Given the articulation of the driving connecting rod 52 on the fixed structure 60 and the fact that this force is exerted on a part of the connecting rod 52 located between its two ends, the driving connecting rod 52 is thus moved in rotation around the axis of rotation formed by said third articulation 73, so as to move the gate 31 upstream via said fourth articulation 74.

This movement of the gate 31 is authorised by the reaction connecting rod 53 which it connects to the fixed structure 60 so as to cause a pivoting of the gate 31 simultaneously in rotation around the axis of rotation formed by said third articulation 73 and in rotation around the axis of rotation formed by said fifth articulation 75.

The movement of the rod 57 of the cylinder 55 upstream in the direction of actuation D1 consequently causes a movement of the gate 31 according to a movement including both a translation upstream and a rotation around each of the axes of rotation formed by the third articulation 73 and by the fifth articulation 75.

The kinematics which has just been described allows to move the gate 31 from the reverse thrust position to the direct thrust position.

It can be deduced from the foregoing and from FIG. 6 that moving the rod 57 of the cylinder 55 downstream in the direction of actuation D1 allows to move the gate 31 from the direct thrust position to the reverse thrust position.

In the embodiment of FIG. 5, the control device 50 comprises three cylinders 55A, 55B and 55C similar to the cylinder 55 of FIG. 6 and six series of connecting rods (not visible in FIG. 5) similar to the series of connecting rods 51, 52 and 53 of FIG. 6.

More specifically, each of the cylinders 55A, 55B and 55C is connected to two series of connecting rods according to the principle illustrated in FIG. 6 so as to simultaneously control two of the gates 31, 32 and 33.

In this example, the cylinder 55A is connected by a first series of connecting rods to the gate 31 and by a second series of connecting rods to the gate 32. In other words, by analogy with FIG. 6, the rod 57 of the cylinder 55A is articulated both to a first control connecting rod 51 of the first series and to a second control connecting rod 51 of the second series. Still by analogy with FIG. 6, the drive 52 and reaction 53 connecting rods of the first series are articulated on the side edge 42 of the gate 31 and the drive 52 and reaction 53 connecting rods of the second series are articulated on the side edge 43 of the gate 32.

Similarly, the cylinder 55B is connected by a third series of connecting rods to the side edge 44 of the gate 32 and by a fourth series of connecting rods to the side edge 45 of the gate 33, while the cylinder 55C is connected by a fifth series of connecting rods to the side edge 46 of the gate 33 and by a sixth series of connecting rods to the side edge 41 of the gate 31.

By simultaneously actuating the cylinders 55A, 55B and 55C, such a control device 50 allows to move the gates 31, 32 and 33 between the direct thrust position and the reverse thrust position, in one direction or the other depending on the direction of movement of the rod 57 of these cylinders in their respective direction of actuation D1.

More generally, such a control device 50 allows to move the gates 31, 32 and 33 according to a movement combining translation and rotation so as to switch from a configuration as illustrated in FIG. 3, wherein the gates extend at least partly axially upstream of the outlet section 12 and radially outside the rear fixed structure 35 of the propulsion unit 7, to a configuration as illustrated in FIG. 4, wherein the gates extend at least partly axially downstream of the outlet section 12 and radially inside this rear fixed structure 35.

Of course, the invention is not limited to the examples which have just been described. For example, the control device 50 may comprise a different number and/or arrangement of connecting rods and may comprise a different actuation device.

In addition, the reverser of the invention can be implemented on another propulsion unit, for example on the propulsion unit 5 or 6 of the aircraft 1 of FIG. 1.

The geometry of the gates 31, 32 and 33 can be adapted according to the requirements for counter-thrust and/or the environment of the propulsion unit, in particular to avoid any collision.

As another example, the cylinder 55 of FIG. 6 can be replaced by any other device capable of driving the articulation 71 of the control connecting rod 51 in translation along the actuating axis D1, such as a motor driving an endless screw cooperating with a carriage guided in translation by a guide member integral with the fixed structure 60.

The reverser may further comprise more than three gates, for example four gates controlled according to the principles described above with reference to FIG. 6.

Thus, each of the gates can generally be controlled by two control devices 50 such as that of FIG. 6 so that for N gates, N cylinders 55 and 2*N sets of connecting rods 51, 52 and 53 such as those illustrated in FIG. 6 can be implemented according to the principles described above.

The invention claimed is:

1. A thrust reverser for propulsion unit of an aircraft, comprising:
   a rear fixed structure forming an outer shroud for guiding a flow of fluid;
   three gates movable between a direct thrust position, wherein the three gates are retracted radially outside the rear fixed structure, and a reverse thrust position wherein the three gates are configured to extend axially downstream of an outlet section of the propulsion unit so as to redirect said flow of fluid leaving the propulsion unit via said outlet section upstream of the propulsion unit; and
   a control device configured to move the gates between the direct thrust position and the reverse thrust position,
   wherein, for each of the three gates, the control device includes
      a cylinder including a fixed part connected to the rear fixed structure of the propulsion unit and a rod sliding relative to the fixed part along an actuating axis,
      a control connecting rod,
      a driving connecting rod, and
      a reaction connecting rod,
      a first end of the control connecting rod being articulated on the rod of the cylinder by a first articulation allowing rotation of the control connecting rod with respect to the rod of the cylinder, and a second end of the control connecting rod being articulated on an intermediate part of the driving connecting rod by a second articulation allowing rotation of the control connecting rod and the driving connecting rod relative to each other,
      a first end of the driving connecting rod being articulated on the rear fixed structure by a third articulation allowing rotation of the driving connecting rod with respect to the fixed structure, and a second end of the driving connecting rod being articulated by a fourth articulation on the respective gate allowing rotation of the respective gate with respect to the driving connecting rod, and a first end of the reaction connecting rod being articulated on the fixed structure by a fifth articulation allowing rotation of the reaction connecting rod with respect to the rear fixed structure, and a second end of the reaction connecting rod being articulated by a sixth articulation on the respective gate allowing rotation of the respective gate with respect to the reaction connecting rod.

2. The thrust reverser according to claim 1, wherein the fourth articulation is disposed on the respective gate upstream of the sixth articulation.

3. A nacelle for an aircraft propulsion unit, comprising a thrust reverser according to claim 1.

4. A propulsion unit for an aircraft, comprising a nacelle according to claim 3.

5. An aircraft, comprising a propulsion unit according to claim 4 and a vertical tail extending in line with the propulsion unit so that a first gate and a second gate of said three gates of the thrust reverser extend laterally on either side, respectively, of the vertical tail.

* * * * *